(No Model.)	7 Sheets—Sheet 1.
M. A. T. BOEHNCKE.
COMBINED BRICK DRIER AND KILN.
No. 395,689.	Patented Jan. 8, 1889.
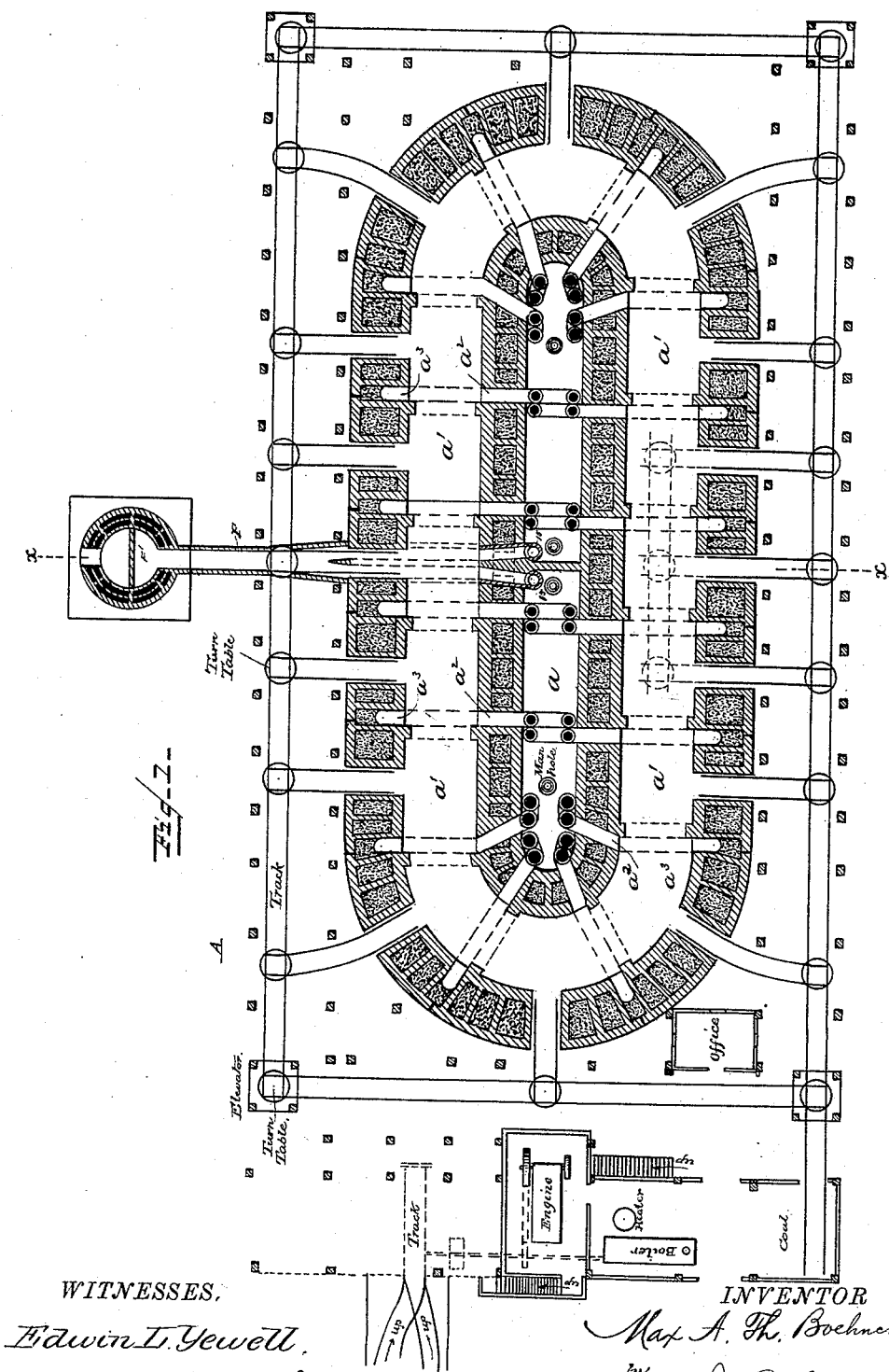
WITNESSES.	INVENTOR
Edwin D. Yewell	Max A. Th. Boehncke,
John Enders Jr	by J. R. Littell,
	Attorney

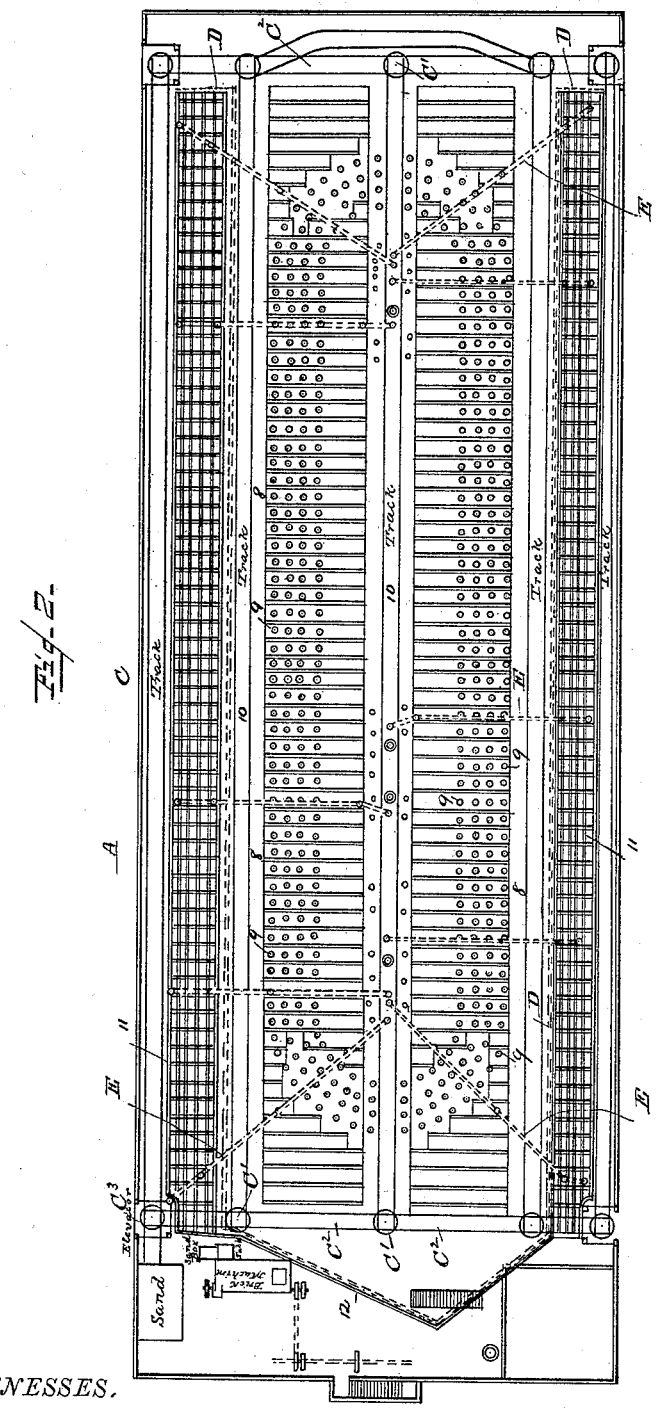

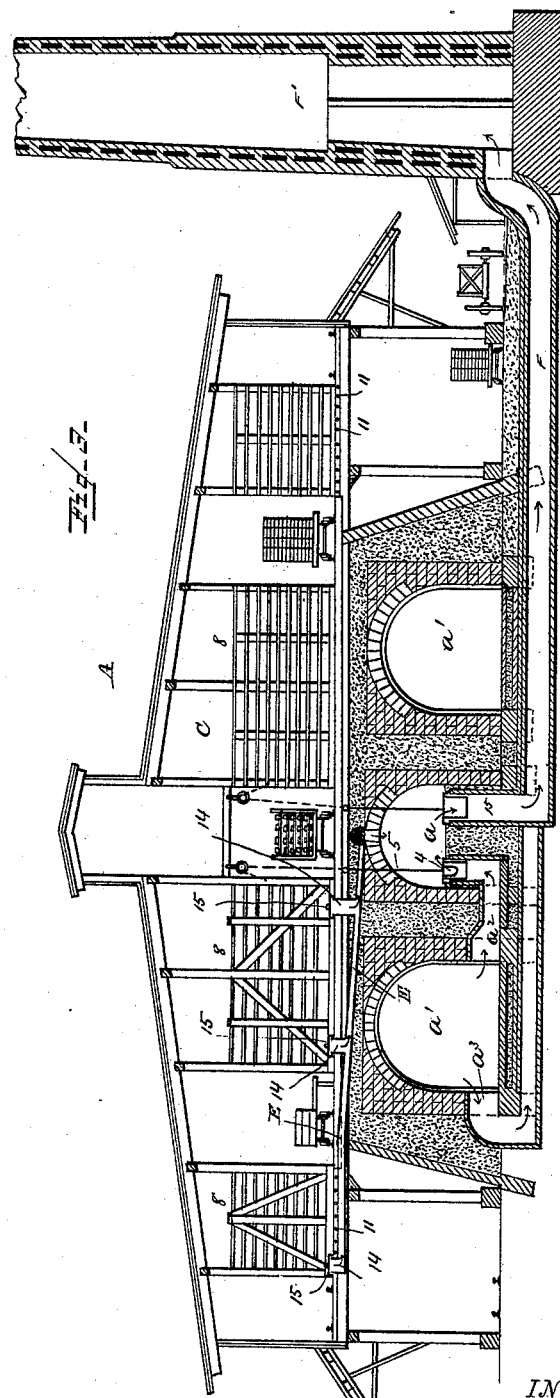

(No Model.) 7 Sheets—Sheet 4.
M. A. T. BOEHNCKE.
COMBINED BRICK DRIER AND KILN.
No. 395,689. Patented Jan. 8, 1889.
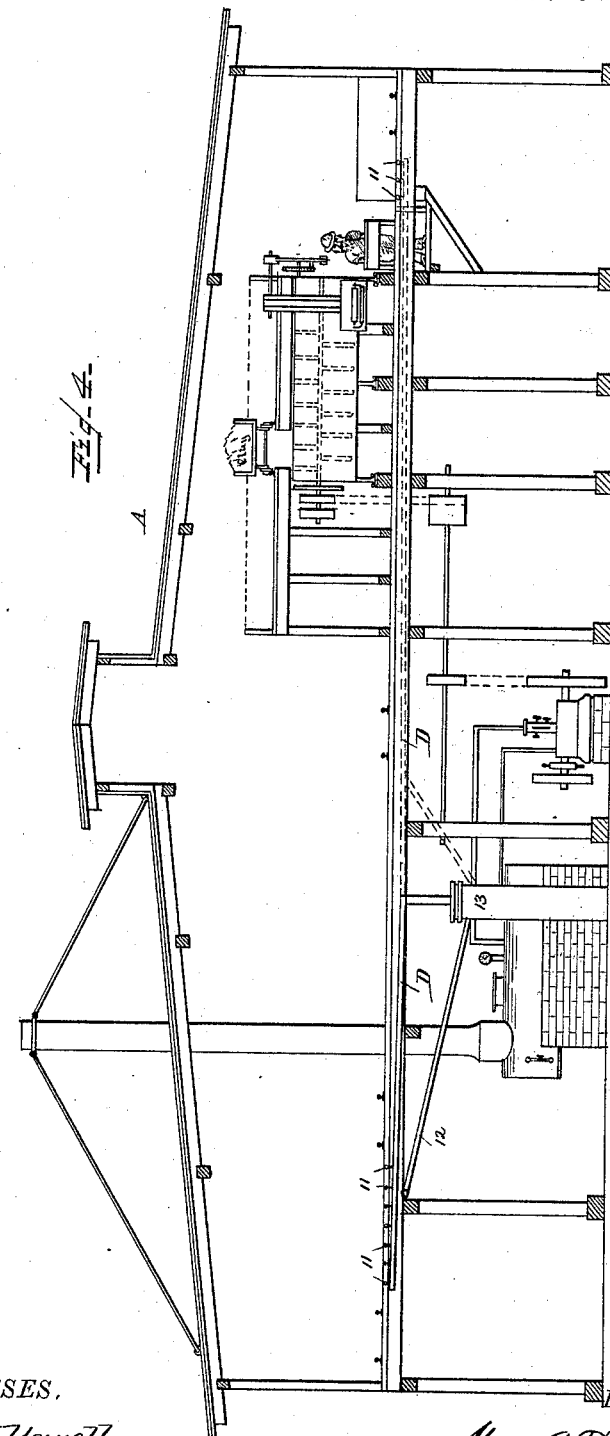
WITNESSES.
Edwin L. Yewell,
John Enders Jr.
INVENTOR.
Max A. Th. Boehncke,
by J. R. Littell,
Attorney.

(No Model.) 7 Sheets—Sheet 5.
M. A. T. BOEHNCKE.
COMBINED BRICK DRIER AND KILN.
No. 395,689. Patented Jan. 8, 1889.
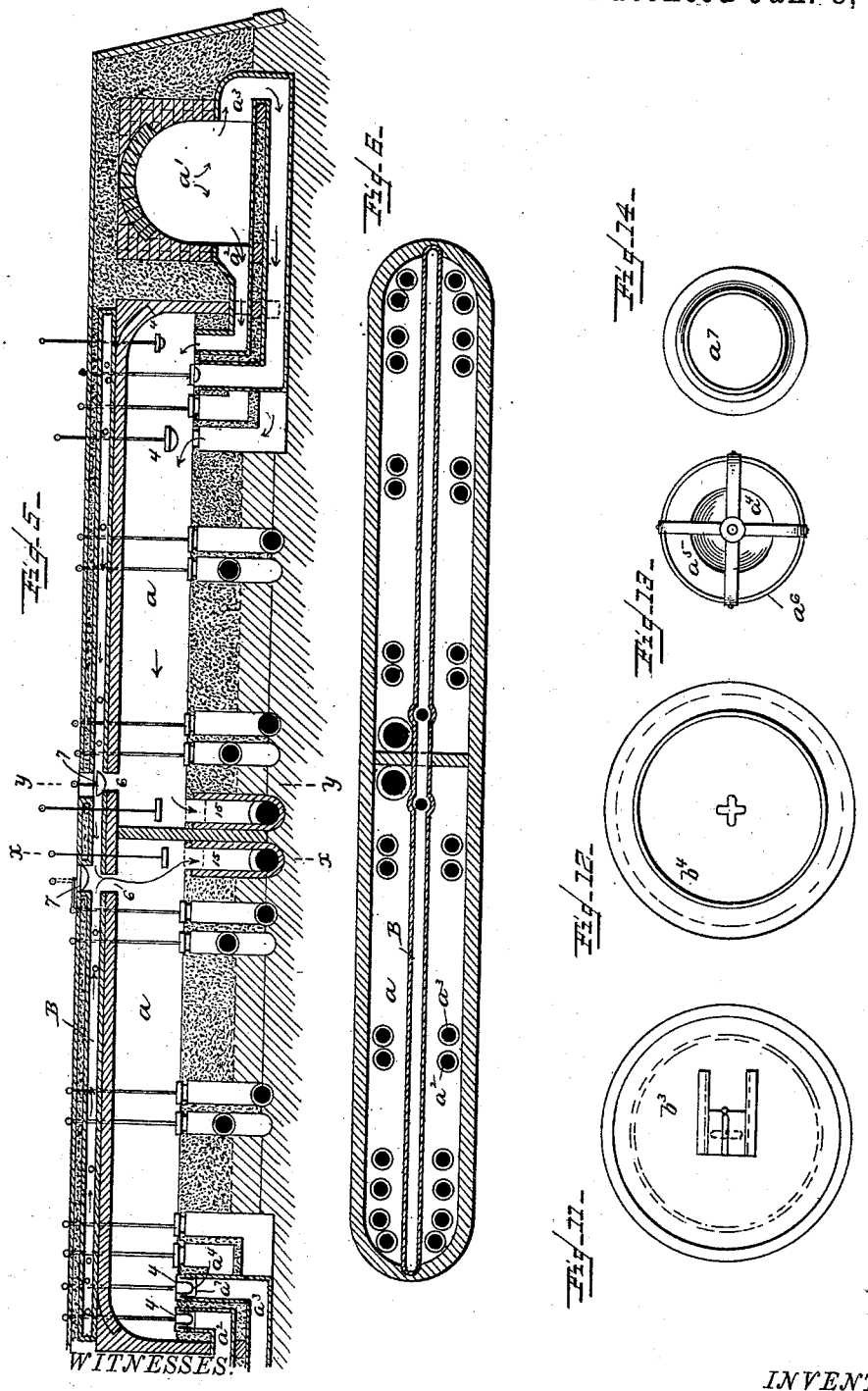
WITNESSES:
Edwin L. Yewell,
John Enders Jr.
INVENTOR.
Max A. Th. Boehncke,
by J. R. Littell,
Attorney.

(No Model.) 7 Sheets—Sheet 6.
M. A. T. BOEHNCKE.
COMBINED BRICK DRIER AND KILN.
No. 395,689. Patented Jan. 8, 1889.
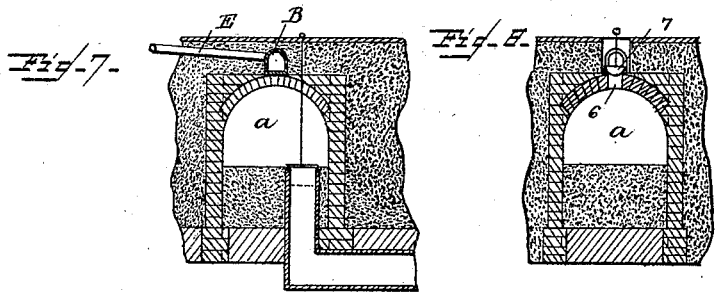
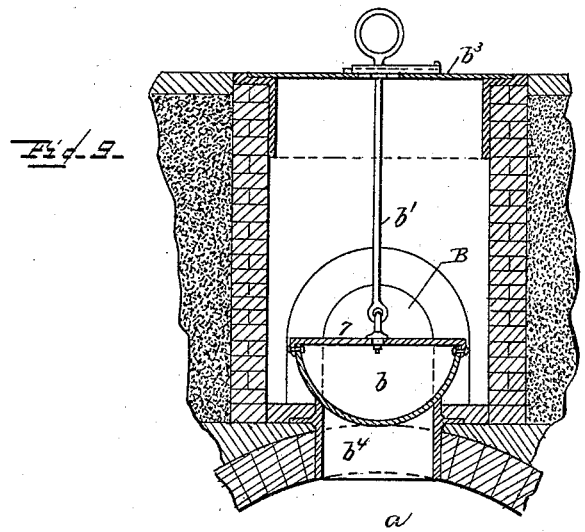
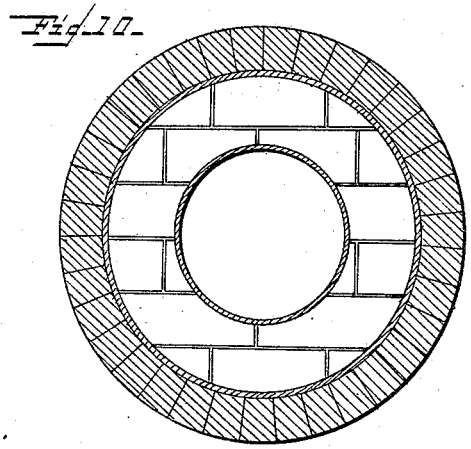
WITNESSES.
Edwin L. Yewell,
John Enders Jr
INVENTOR
Max A. Th. Boehncke,
by J. R. Littell
Attorney (No Model.) 7 Sheets—Sheet 7.
M. A. T. BOEHNCKE.
COMBINED BRICK DRIER AND KILN.
No. 395,689. Patented Jan. 8, 1889.
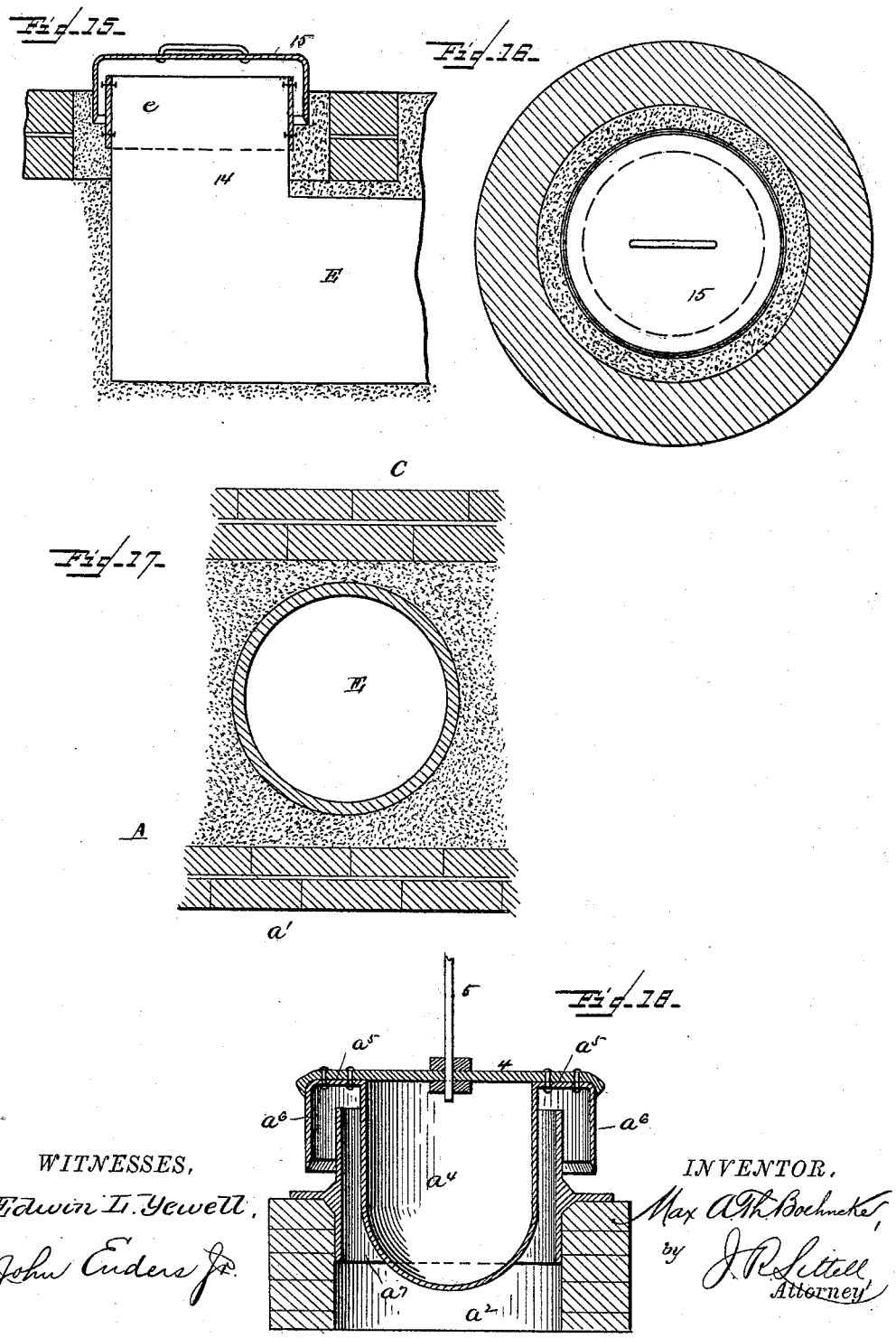
WITNESSES, INVENTOR,

UNITED STATES PATENT OFFICE.

MAX A. TH. BOEHNCKE, OF OMAHA, NEBRASKA, ASSIGNOR TO THE CONTINUOUS KILN COMPANY, OF SAME PLACE.

COMBINED BRICK DRIER AND KILN.

SPECIFICATION forming part of Letters Patent No. 395,689, dated January 8, 1889.

Application filed February 3, 1888. Serial No. 262,845. (No model.)

*To all whom it may concern:*

Be it known that I, MAX A. TH. BOEHNCKE, a citizen of the United States, residing at Omaha, in the county of Douglas and State of Nebraska, have invented certain new and useful Improvements in a Combined Brick Kiln and Drier, of which the following is a specification, reference being had therein to the accompanying drawings.

This invention relates to certain new and useful improvements in continuous kilns and driers, having reference more particularly to the drier or drier-chamber.

The object of my invention is to provide a simple and improved combined kiln and drier of this character, whereby the vapor or moisture arising from the green bricks in the drier or drier-chamber is drawn from the bottom of the drier into the smoke-chamber and out through suitable flues into the smoke-stack, and by thus drawing off the vapor or moisture the warm and dry air is readily drawn toward the bottom of the drier, thus creating a perpetual circulation and draft without the necessity of admitting the outside air.

To these ends the invention comprises simple and efficient means for supplying heat to the drier and for withdrawing the vapor or moisture from said drier through suitable pipes which are so arranged as to prevent condensation of the vapor or moisture.

A further object of my invention is the production of a drier which will possess advantages in point of inexpensiveness, durability, and general efficiency.

In the accompanying drawings, Figure 1 is a horizontal sectional view taken above the foundations, and showing the brick-kiln in connection with which my invention is preferably employed. Fig. 2 is a horizontal sectional view showing the driers. Fig. 3 is a vertical transverse sectional view taken on the line $x\,x$, Fig. 1. Fig. 4 is a similar view, showing diagrammatically the engine and boiler. Fig. 5 is a vertical longitudinal sectional view taken through the smoke-chamber of the kiln. Fig. 6 is a horizontal sectional view of said smoke-chamber. Fig. 7 is a transverse vertical sectional view on the line $x\,x$, Fig. 5. Fig. 8 is a transverse vertical sectional view on the line $y\,y$, Fig. 5. Fig. 9 is a vertical sectional detail view of my improved damper for the smoke-flues. Fig. 10 is a detail plan view of ventilation-box. Fig. 11 is a detail top view of box-pipe and cover. Fig. 12 is a detail bottom view of box-pipe and cover. Fig. 13 is a detail top view of damper. Fig. 14 is a detail top view of damper-pipe. Fig. 15 is a detail sectional view showing one of the ventilator-caps. Fig. 16 is a plan view of the latter. Fig. 17 is an enlarged cross-sectional view of one of the ventilator-pipes, showing the manner of securing the same in position; Fig. 18, a sectional view of damper.

Corresponding parts in all the figures are denoted by the same letters of reference.

Referring to the drawings, A designates the continuous kiln, which is preferably oval in horizontal section and divided into any number of compartments, as shown in Fig. 1. This kiln is provided with a continuous smoke-chamber, $a$, and the arched compartments $a'$, which have each a double connection with the smoke-chamber by means of an inside and outside flue, $a^2\,a^3$, as shown, each of said flues being provided at its upper end within the smoke-chamber with dampers 4, having rods 5 projecting up through apertures in the top of the kiln. These dampers are composed of curved downwardly-projecting plates $a^4$, having horizontal and vertical flanges $a^5\,a^6$, and fit within and around a short flue-extension pipe, $a^7$, in the upper ends of said flues $a^2\,a^3$.

By means of the inside and outside flues $a^2\,a^3$ the smoke from the compartments $a'$ can be drawn through either one or both of said flues by regulating the respective dampers 4, which rest on the outer ends of said flues within the smoke-chamber. The arrows in Fig. 3 indicate the direction of the flight of the smoke when the dampers are opened. Said dampers are shown closed in said figures.

B is a long continuous main ventilator-pipe disposed over the smoke-chamber, the same having connection with said chamber at or near its center through openings or apertures 6 6, which are provided with dampers 7 7, also having their rods projecting up through apertures in the top of the kiln. The dampers 7 consist of a semicircular or bowled plate, $b$, having upper cross-rods, to the centers of which are connected the lower ends of the operating-rods, $b'$, which project up through a lid or cover, $b^3$, disposed in the top of a circular opening in the top of the kiln, said damper, when lowered, resting upon the upper end of a short pipe, $b^4$, secured within the wall between the smoke-chamber and the main ventilator-pipe, as shown.

In practice the smoke issuing from one set of compartments, $a'$, of the kiln is admitted into the smoke-chamber and permitted to pass out through the flue 15 to the smoke-stack, during which the damper 7 closes the opening 6 into this portion of the smoke-chamber, as shown in Fig. 5, while the vapor or moisture from the drier passes into the other portion of the smoke-chamber out through its flue 15, the damper 7, covering the opening into this portion of the smoke-chamber, being raised. By this means the passage of the vapor or moisture from the drier will not retard or interfere with the passage of the smoke from the kilns.

The kiln herein described forms no part of the subject-matter of this invention, the same being covered by an application, Serial No. 262,844, filed herewith.

Upon the top of the kiln, which may or may not be constructed in accordance with the above description, I dispose my improved drier or drier-chamber C. Within this drier or drier-chamber are arranged a series of racks, 8 8, extending longitudinally the length of the drier, said racks being disposed between the heat-supplying holes or apertures 9, (see Fig. 2,) and on either side of the drier near the walls thereof. These holes or apertures 9 are formed in the top of the kiln and bottom of the drier, and may, if desired, have narrow tubes or pipes secured therein. Through these feed holes or apertures 9 hot air will pass from the kiln into the drier. On either side of these drying-racks are placed longitudinal tracks 10, connecting at their ends, by means of turn-tables $C'$, with transverse tracks $C^2$. Upon these tracks are designed to roll the trucks employed in conveying the green bricks to the drying-racks, and also for conveying said bricks, when dried, to a suitable elevator, (indicated at $C^3$,) disposed in one corner of the drier-chamber, for lowering the bricks into the kiln for setting and burning.

Around the drier, under the outer or side series of drying-racks, are passed steam-exhaust pipes 11, with which is connected a main pipe, 12, leading from the exhaust-steam chamber 13 of the engine, said exhaust-steam being conveyed through said main pipe to said exhaust-pipes, through which it is designed to disseminate. Adjacent to each series of these steam-exhaust pipes is a continuous pipe, D, which is secured by suitable means to the supporting-frame of the drier which is below said exhaust-steam pipes, each of said pipes D being designed for conveying condensed steam or water back to the heater or boiler, said pipe being connected at its other end to the forward ends of the exhaust-steam pipes of each series. It is obvious that the exhaust-steam is disseminated through the series of pipes around the entire drier, and is conveyed through the pipes D back to the heater or boiler.

Throughout the drier are disposed at suitable distances apart, under the floor of said drier and over the top of the kiln, ventilator-pipes E E, which are provided at their outer ends and at suitable distances apart under the drying-racks with short extensions 14, upon which are fitted dampers 15, the inner ends of said pipes being extended into the continuous main ventilator-pipe B, said ventilator-pipe being designed to convey or carry off from the bottom of the drier the vapor therein produced, and thereby cause the warm and dry air naturally induced into the drier and the heat which arises from the steam-exhaust pipes and from the kiln proper, especially through the holes or apertures 9, to be drawn toward or retained near the bottom of the drier, thus creating a perpetual circulation and draft without the necessity of admitting the outside air to the drier-chamber.

The ventilator-pipes E, above referred to, are made preferably of galvanized iron, and are placed between the joists of the building, and are so packed and disposed with relation to the kiln as to prevent condensation of the vapor, as shown in Fig. 17. The short extensions of these ventilator-pipes are provided, as before stated, with dampers, which consist of a cap having a handle and an outer circumferential flange, which fits down and over the upper portion of a short pipe, $e$, fitted in said extensions of the ventilator-pipe, said dampers being capable of manipulation within the drier-chamber.

In practice the green bricks are placed upon the trucks and carried to the drier-racks, and are then placed onto said drier-racks, and the heat naturally rising from the top of the kiln, together with the heat escaping from the holes or apertures 9 from the lower compartments of the kiln and the heat from the exhaust-steam pipes 11, will effect the drying of the bricks in a comparatively short space of time, the heat thus produced being of a very superior nature for this purpose, and the same being effected to a certain extent in utilizing that heat which necessarily arises from the kiln. The vapor or moisture resulting from the heat on the green bricks will be conveyed from the drier, through the ventilator-pipes, to the main pipe B, from which, by opening either one of the dampers 7, said vapor or moisture will pass into that one of compartments of the smoke-chamber not being used for the escaping smoke from the kiln, and through which it will pass directly into one of the flues 15, leading to the chimney or smoke-stack, said flues being converged into a single passage-way or flue, F, leading into the smoke-stack $F'$.

I do not confine myself strictly to the use of the main ventilator-pipe B, into which these series of ventilator-pipes E open, and, if desired, without departing from the spirit of my invention, said series of ventilator-pipes can be caused to open directly into the top of the smoke-chamber.

The operation and advantages of my invention will be readily understood by those skilled in the art to which it appertains, and it is manifest that numerous modifications may be made in the details of construction, as herein illustrated, without departing from the spirit and scope of my invention. I therefore do not limit myself to the exact construction and arrangement of parts herein shown and specified.

I claim as my invention—

1. The combination, with a brick-kiln having a continuous central smoke-chamber and the main ventilator-pipe B opening thereinto, of the drier-chamber disposed on said kiln, the series of ventilator-pipes having short extensions projected through the bottom of said chamber, and the dampers disposed on said extension, substantially as described, the inner ends of said ventilator-pipes E being secured to said main ventilator-pipe B, as stated.

2. The combination, with the brick-kiln having the continuous main ventilator-pipe, of the drier-chamber, and ventilator-pipes disposed between said drier-chamber and kiln and having openings into said drier-chamber and opening into said main ventilator-pipe, substantially as shown and described.

3. The combination, with the brick-kiln having a smoke-chamber provided with a continuous main ventilator-pipe having damper-covered openings or apertures extending into said smoke-chamber, of the drier-chamber, the series of drying-racks, the steam-exhaust pipes, the steam-supply pipe, the water-condensation pipe, and the ventilator-pipes opening into the bottom and arranged substantially as shown and described.

In testimony whereof I affix my signature in presence of two witnesses.

MAX A. TH. BOEHNCKE.

Witnesses:
WM. SANDELL,
JAMES O'NEIL.